United States Patent [19]
Hitachiya et al.

[11] Patent Number: 5,883,669
[45] Date of Patent: Mar. 16, 1999

[54] DISPLAY DEVICE USING ELECTRON BEAM AND METHOD OF ERASING DISPLAY SCREEN

[75] Inventors: Noriyuki Hitachiya, Tokyo; Kunio Hakamada, Saitama; Sumio Baba, Chiba; Yoshiyuki Idenawa; Hirokatsu Kubota, both of Kanagawa, all of Japan

[73] Assignee: Sony Corporation, Tokyo, Japan

[21] Appl. No.: 499,581

[22] Filed: Jul. 7, 1995

[30] Foreign Application Priority Data

Jul. 8, 1994 [JP] Japan ................................ 6-179697
Feb. 3, 1995 [JP] Japan ................................ 7-037756

[51] Int. Cl.⁶ .................................................. H04N 3/20
[52] U.S. Cl. .......................... 348/377; 348/730; 315/380
[58] Field of Search .................................. 348/377, 380, 348/634, 635, 173, 730, 809, 810, 569, 381, 382; 315/380, 383, 386; H04N 3/20

[56] References Cited

U.S. PATENT DOCUMENTS

| | | | |
|---|---|---|---|
| 4,723,167 | 2/1988 | Griffey | 348/730 |
| 5,059,961 | 10/1991 | Cheng | 348/634 |
| 5,184,225 | 2/1993 | Heideboek et al. | 348/378 |
| 5,266,870 | 11/1993 | Jang | 348/730 |
| 5,430,596 | 7/1995 | Hamaguchi et al. | 348/377 |

FOREIGN PATENT DOCUMENTS

| | | | |
|---|---|---|---|
| 0521378 | 1/1993 | European Pat. Off. | H04N 3/20 |
| 0043661 | 1/1992 | Japan | H04N 3/20 |

*Primary Examiner*—Sherrie Hsia
*Attorney, Agent, or Firm*—Jay H. Maioli

[57] ABSTRACT

A device having a display device employing a cathode-ray tube and an electron beam includes an on-screen display memory for storing data used to display white on an entire screen of the cathode-ray tube, a circuit for supplying signals used to display white on the entire screen of the said display device employing the electron beam based on the data stored in the on-screen display memory, and a controller for outputting a signal indicative of a command for displaying white on the entire screen from the on-screen display memory in accordance with a de-energizing operation. The signals used to display white on an entire screen of the cathode-ray tube are output to the display device employing the electron beam after the device having the display device is de-energized. Displayed contents are erased by removing a residual high voltage in the display device employing the electron beam.

8 Claims, 4 Drawing Sheets

5,883,669

DISPLAY DEVICE USING ELECTRON BEAM AND METHOD OF ERASING DISPLAY SCREEN

BACKGROUND OF THE INVENTION

1. Field of the Invention

The present invention relates to a display device employing an electron beam for erasing a spot afterglow on a video tube for use in apparatus such as a television receiver, a monitor, or the like, and a method of erasing a display screen thereof.

2. Description of the Related Art

When a television receiver is operated, the television receiver modulates, based on R, G, B video signals, an electron beam radiated from a cathode disposed in an electron gun of a cathode-ray tube (CRT) that lands on an anode on a fluorescent screen applied with a high voltage. Thus, the television receiver displays a color picture on the CRT.

Therefore, a high voltage (hereinafter referred to as an anode voltage) applied to the anode on the fluorescent screen in the CRT when the television receiver is operated remains for a certain time even after the television receiver has been de-energized. As a result, there occurs an afterglow phenomenon in which, when a deflection scanning is stopped, the electron beam converges on a substantial center on the picture screen of the CRT and persistent light spot remains. This phenomenon leads to screen burning of the CRT.

However, a Trinitron (registered trademark) CRT employing a single-electron gun includes an incorporated resistor, i.e., an inner bleeder resistor (IBR) in order to apply to an electrostatic deflection plate in the CRT a convergence voltage which is 4% to 8% smaller as compared with the anode voltage. In this case, when the television receiver is de-energized, the residual anode voltage on the fluorescent screen is quickly discharged to thereby avoid the spot afterglow to a certain degree.

FIG. 1 is a cross-sectional view showing a part of an arrangement of a single-electron gun type CRT including the IBR. An anode button 51 has a shape of a cavity cap. The anode button 51 is applied with an anode voltage from a high voltage generator (not shown) provided in the television receiver. An internal carbon 52 is coated on the inner surface of a CRT 50. The internal carbon 52 supplies the anode voltage applied from the anode button 51 to a fluorescent screen (not shown) in the CRT 50 and to an IBR 54 of an electron gun 53.

The IBR 54 divides the anode voltage to apply a convergence voltage to an electrostatic deflection plate 55. The convergence voltage is adjusted by changing a resistance value of a variable resistor 56 provided outside the CRT 50.

FIG. 2 shows a diagram showing an example of a structure of the IBR 54 which is the incorporated resistor. A resistor 62 in the form of a pattern is disposed on a ceramic substrate 61. The IBR 54 includes an electrode 63 applied with the anode voltage, an electrode 64 for applying the convergence voltage to the electrostatic deflection plate 55, and an electrode 65 connected through the variable resistor 56 to a ground line. An overcoat glass 66 is made of an insulating material and formed on the ceramic substrate 61 except at the electrodes 63, 64 and 65 so as to cover the resistor 62.

Thus, when the television receiver having the IBR 54 incorporated in the CRT 50 is de-energized, the anode voltage remaining on the fluorescent screen of the CRT 50 is quickly discharged therefrom through the internal carbon 52, the IBR 54, and the variable resistor 56, preventing the spot afterglow on the fluorescent screen of the CRT 50.

When a Trinitron CRT employing three electron guns and a shadow mask type CRT employing three electron guns is used, three IBRs must be provided inside the respective three electron guns in order to prevent the spot afterglow. Therefore, there is then the disadvantage that the CRT inevitably becomes large in size and it costs more to manufacture such CRT.

It is very difficult to dispose the three IBRs in a small space in the CRT employing three electron guns. After the television receiver is de-energized, the high voltage remains on the anode surface for a certain time. Especially, when an aperture grill-type CRT employing three electron guns and having a high ratio of apertures relative to a screen is used, there is then the problem that the residual voltage generates the spot afterglow and the spot afterglow damages the fluorescent screen.

SUMMARY OF THE INVENTION

In view of such aspects, it is an object of the present invention to provide a display device employing an electron beam and a method of erasing a displayed picture in which spot afterglow on the screen is erased within a short period of time by outputting a signal indicative of data to display white on the entire screen after a device having the display device is de-energized.

According to a first aspect of the present invention, in a display device employing a cathode-ray tube and an electron beam, the signal indicative of data to display white on the entire screen of the cathode-ray tube is output to the display device employing the electron beam after the device is de-energized. Displayed contents are erased by removing a residual high voltage in the display device employing the electron beam.

According to a second aspect of the present invention, the device having the display device employing the cathode-ray tube and the electron beam includes an on-screen display memory for storing data used to display white on the entire screen, means for supplying the signals used to display white on the entire screen to the display device employing the electron beam based on the data stored in the on-screen display memory, and control means for outputting the signal indicative of data to display white on the entire screen from the on-screen display memory after the device having the display device is de-energized.

According to the present invention, if a signal indicative of data to display white on the entire screen is output under the control of the control means when the device is de-energized, then there are increased electron beams radiated to an anode on a fluorescent screen from an electron gun of the display device when the device having the display device is de-energized. At this time, a current corresponding to electron beams for displaying white on the entire screen flows from the anode to a cathode side and a residual high voltage at the anode is lowered rapidly. Therefore, it is possible to prevent the spot afterglow on the screen of the display device.

According to the present invention, since the signal indicative of data to display white on the entire screen is output after the device having the display device is de-energized to remove the residual high voltage at the anode of the fluorescent screen of the display device, it is possible to prevent the spot afterglow on the screen and to prevent the screen burning of the cathode-ray tube of the display device. Particularly, if the present invention is applied to a three electron gun type display device, then it is possible to easily prevent the spot afterglow on the cathode-ray tube without any change in the structure of the display device.

DESCRIPTION OF THE PREFERRED EMBODIMENT

Figure 1:
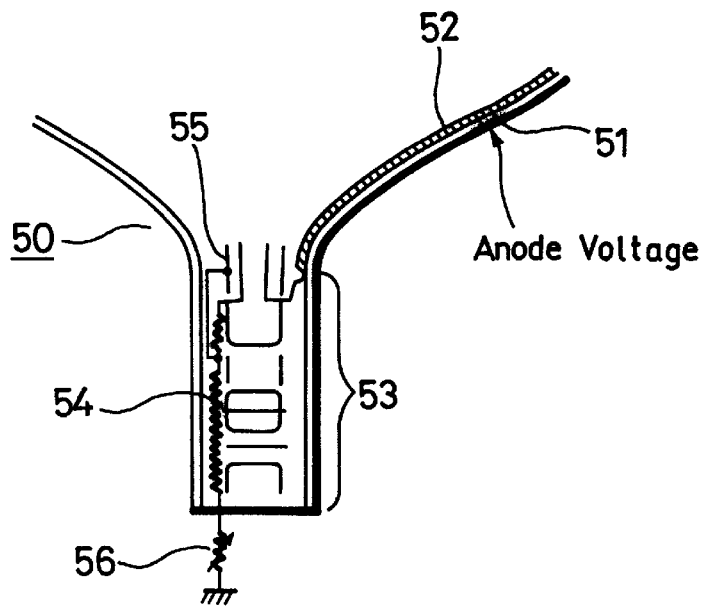
FIG. 1 is a schematic, cross-sectional view showing a part of a single-electron gun type cathode-ray tube having an incorporated resistor IBR.
Figure 2:
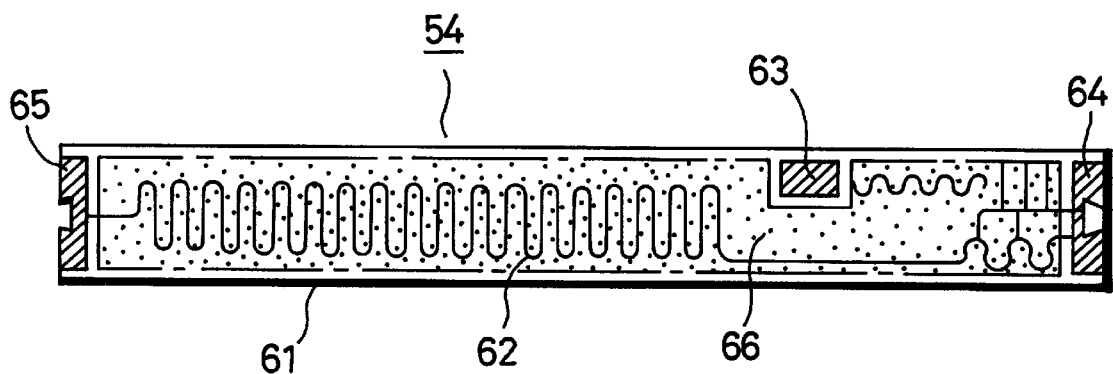
FIG. 2 is a diagram showing a structure of the incorporated resistor IBR.
Figure 3:
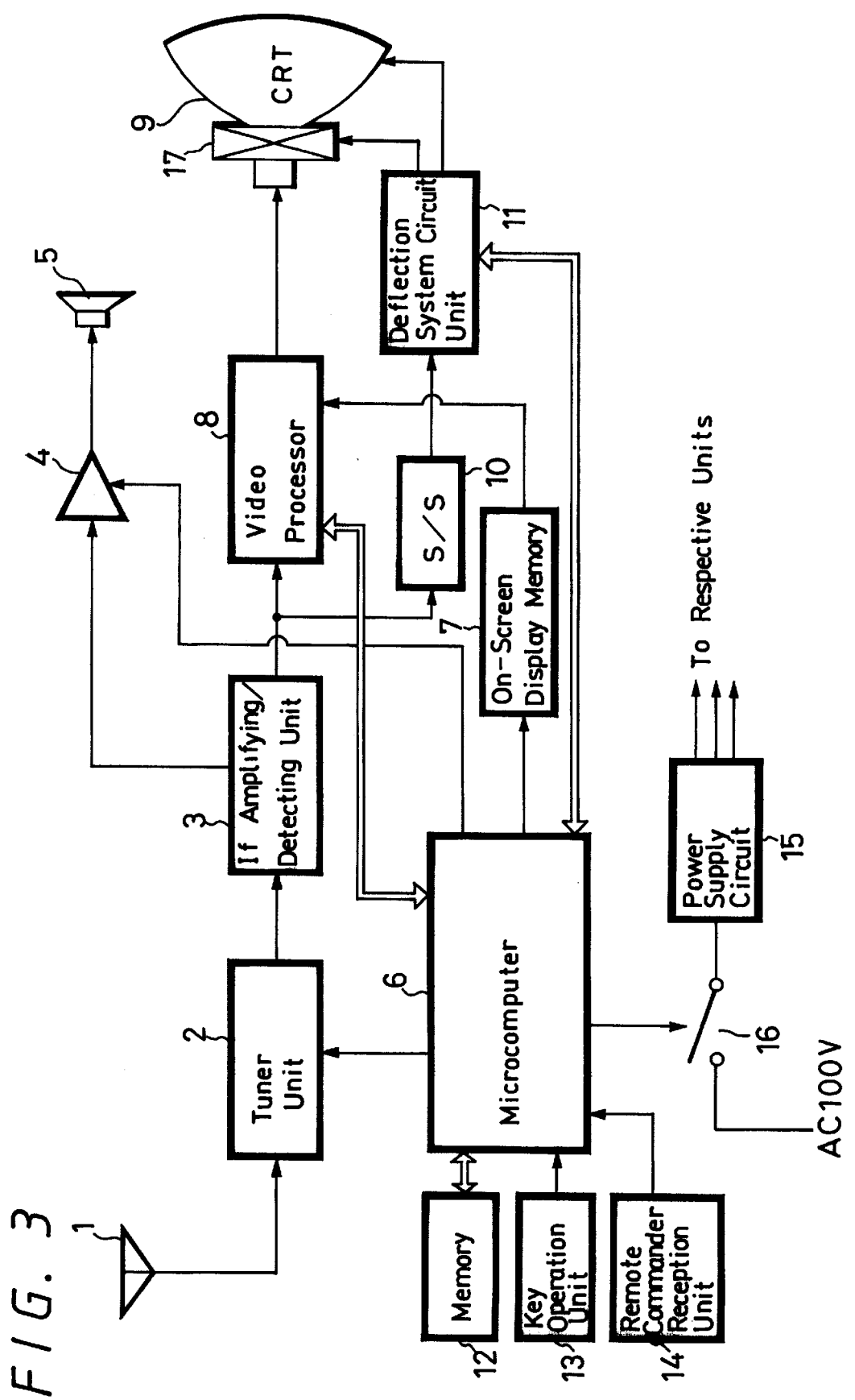
FIG. 3 is a block diagram showing a schematic arrangement of a television receiver having a display device using an electron beam according to an embodiment of the present invention.

FIG. 3 is a block diagram showing a schematic arrangement of a television receiver having a display device using an electron gun according to an embodiment of the present invention.

As shown in FIG. 3, an antenna 1 receives a broadcast wave. A tuner unit 2 selects one of UHF/VHF broadcast waves received at the antenna 1. An intermediate frequency (IF) amplifying/detecting unit 3 amplifies and detects an IF signal output from the tuner unit 2. The IF amplifying/detecting unit 3 detects an audio signal and a video signal from the IF signal. An amplifier 4 amplifies the detected audio signal output from the IF amplifying/detecting unit 3. An amplification degree of the amplifier 4 is adjusted based on a control signal from a microcomputer 6 which will be described later on. A speaker 5 emanates the amplified audio signal as sounds.

The microcomputer 6 controls operations of the respective units of the television receiver. An on-screen display memory 7 stores signals indicative of data of characters including a figure and used to visually display various kinds of adjustment items and adjustment amounts, and a signal which indicates data to display white on the entire display screen of a CRT 9 and is used in a display screen erasing method according to the present invention. A video processor 8 effects various processings on the detected video signals output from the IF amplifying and detecting unit 3 and also processes the signal indicative of the characters supplied from the on-screen display memory 7. The CRT 9 displays a-picture based on R (red), G (green), B (blue) video signals supplied from the video processor 8.

A synchronizing separating circuit (S/S) 10 detects a vertical synchronizing signal and a horizontal synchronizing signal from the video signal. A deflection-system circuit unit 11 supplies a deflection current to a deflection system 17 including vertical and horizontal deflection coils equipped in the CRT 9. A memory 12 stores information required to control the respective units. A key operation unit 13 is provided in the television receiver body (not shown). A remote commander reception unit 14 receives a command signal from a remote commander (not shown) and supplies the received command signal to the microcomputer 6.

A power supply circuit 15 supplies a voltage to the respective units in the television receiver. A switch 16 is used to turn on or off the power switch of the television receiver by pressing a power key provided in the key operation unit 13 or a power key provided in the remote commander (not shown) under the control of the microcomputer 6.

The microcomputer 6 is connected to the memory 12, the video processor 8 and the deflection-system circuit unit 11 through a serial interface (SIO) or a Philips-bus interface ($I^2C$).

The deflection-system circuit unit 11 supplies a high voltage ranging from 20 to 30 KV to an anode of the CRT 9 in accordance with the size of the CRT 9,. An electron beam radiated from each electron gun, which will be described later on, provided in the CRT 9 is accelerated to phosphors on the fluorescent screen by the anode voltage.

An operation of the television receiver according to the embodiment of the present invention will be described briefly. When the television receiver is operated normally, the tuner unit 2 selects a predetermined received broadcast wave from the UHF/VHF broadcast waves received at the antenna 1. The tuner unit 2 down-converts the received signals into the signals with intermediate frequencies (IF) and outputs the IF signals to the IF amplifying/detecting unit 3. The IF amplifying/detecting unit 3 amplifies the IF signal and detects the video signal and the audio signal from the amplified IF signal.

The audio signal detected by the IF amplifying/detecting unit 3 is supplied to the amplifier 4. Based on a control signal supplied from the microcomputer 6, the audio signal is amplified by the amplifier 4 so as to have a predetermined magnitude. The amplifier 4 supplies the amplified audio signal to the speaker 5. The speaker 5 emanates the audio signals as the sounds.

The composite video signal detected by the IF amplifying/detecting unit 3 is supplied to the video processor 8. The video processor 8 subjects the supplied composite video signal to various processings, converts the composite video signal into the R, G, B video signals, and supplies the R, G, B video signals to the CRT 9. The synchronizing separating circuit 10 detects the vertical and horizontal synchronizing signals from the composite video signals and supplies the vertical and horizontal synchronizing signals to the deflection system circuit unit 11. Based on the R, G, B video signals output to the CRT 9, the respective R, G, B electron guns radiate the electron beams to the anode which is applied with the high voltage. The electron beams are deflected by the deflection system 17 supplied with vertical and horizontal deflection currents from the deflection-system circuit unit 11. The deflected electron beams scan the fluorescent screen. Thus, a color picture is displayed on the CRT 9.

Figure 4:
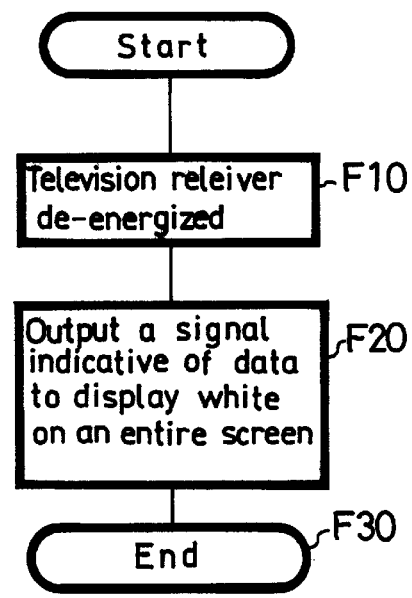
FIG. 4 is a flowchart used to explain an operation of erasing a display screen according to the embodiment of the present invention.

As shown in a flowchart of FIG. 4, the television receiver is de-energized in step F10 when the key operation unit 13 provided in the television receiver body (not shown) supplies to the microprocessor 6 a signal indicative of a command for de-energizing the television receiver, or when the remote commander (not shown) transmits a command for de-energizing the television receiver to the remote commander reception unit 14 and the reception unit 14 supplies to the microprocessor 6 the signal indicative of the command for de-energizing the television receiver.

At this time, under the control of the microcomputer 6, the switch 16 is set in its "off" state to stop, supplying a voltage from a commercially-available power supply (AC 100V) to the power supply circuit 15. A scanning current output from the deflection system circuit unit 11 is immediately converged to zero. Since a current flowing into a high voltage circuit (not shown) for applying a high voltage to the CRT 9 is extremely small, the anode voltage is lowered gradually. Therefore, the electron beam radiated from each electron gun converges to a center portion on the CRT to produce strong spot afterglow.

After the television receiver is de-energized, a control signal which is stored in the on-screen display memory 7 and which indicates a command for displaying white on the entire screen is supplied to the video processor 8 in step F20. In step F30, a control operation according to the present invention is ended.

In this case, based on the control signal indicative of the command to display white on the entire screen, the video processor 8 supplied with the control signal outputs, for a time substantially ranging from 100 ms to ®ms but generally one second or less, the R, G, B video signals each having a maximum level in order to display white on the entire screen of the CRT 9. Accordingly, based on the R, G, B video signals output from the video processor 8, the electron guns provided in the CRT 9 radiate strong electron beams to the anode on the fluorescent screen which is held at a high voltage level as compared with the normal picture display.

Thus, the high voltage remaining at the anode even when the television receiver is de-energized flows as a beam current from the anode to the cathode side. At this time, the high voltage remaining at the anode is lowered rapidly. Even after the television receiver is de-energized, the on-screen display 7 and the video processor 8 are operated until the voltage output from the power supply circuit 15 is discharged. Therefore, it is possible to output the R, G, B video signals used to display white on the entire screen of the CRT 9 at least until the high voltage remaining at the anode is almost discharged.

Figure 5A:
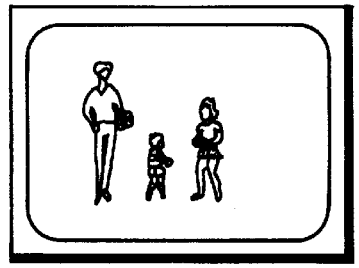
FIGS. 5A to 5C are diagrams showing pictures output on the screen of the CRT and used to explain the display screen erasing method according to the embodiment of the present invention.
Figure 5B:
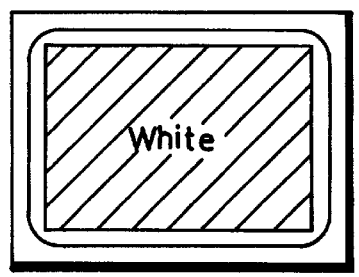
Figure 5C:
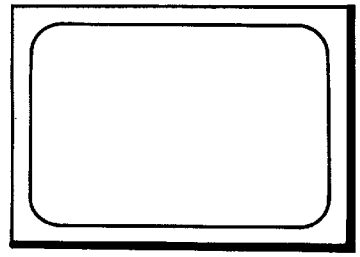

FIGS. 5A to 5C are diagrams showing pictures displayed on the screen of the CRT 9 and used to explain the display screen erasing method according to the embodiment of the present invention. FIG. 5A shows a picture displayed on the screen when the television receiver is operated normally. Immediately after the television receiver is de-energized, the electron guns of the CRT 9 radiate the electron beams for displaying a white picture on the entire screen as described above. The white picture is displayed on the entire screen for a period ranging from 100 ms to 200 ms as shown in FIG. 5B. After a raster indicating an entirely white picture is reduced, the screen has no spot afterglow as shown in FIG. 5C.

As described above, when the CRT 9 is the three-electron gun type CRT, it is possible to discharge the residual anode voltage on the fluorescent screen without the incorporated resistor IBR being provided in each of the electron guns. Therefore, it is possible to avoid the spot afterglow on the CRT and it is possible to avoid the screen burning of the CRT.

The three-electron gun type CRT will briefly be described below. The three-electron gun type CRT includes three electron guns for red (R), green (G) and blue respectively (B). The three-electron gun type CRT employs an inline-type gun arrangement or a delta-type gun arrangement. In the inline-type gun arrangement, the three electron guns are arranged in a line on a horizontal plane. In the delta type gun arrangement, the three electron guns are arranged at the corners of a equilateral triangle.

Figure 6A:
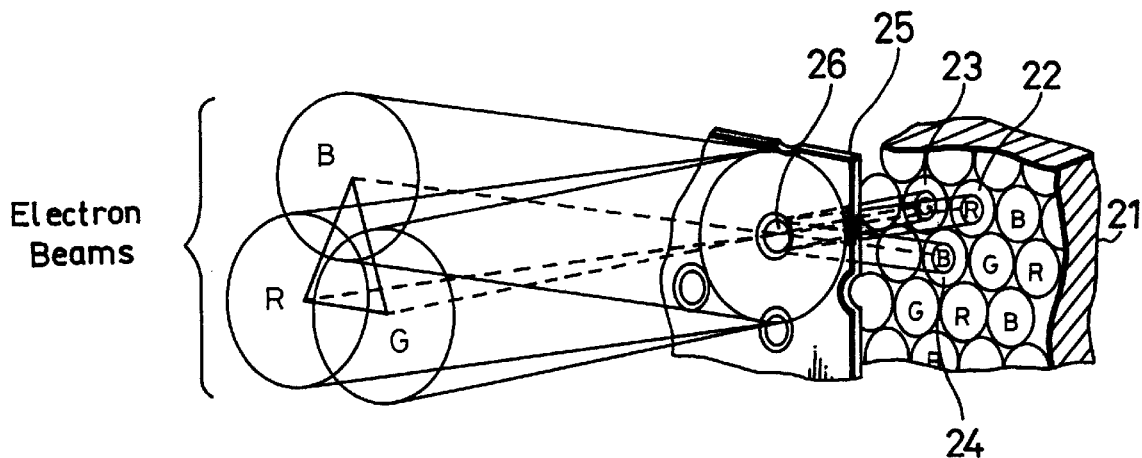
FIGS. 6A to 6C are schematic diagrams showing structures of the shadow masks or an aperture grill and the fluorescent screens of three electron gun type CRTS.
Figure 6B:
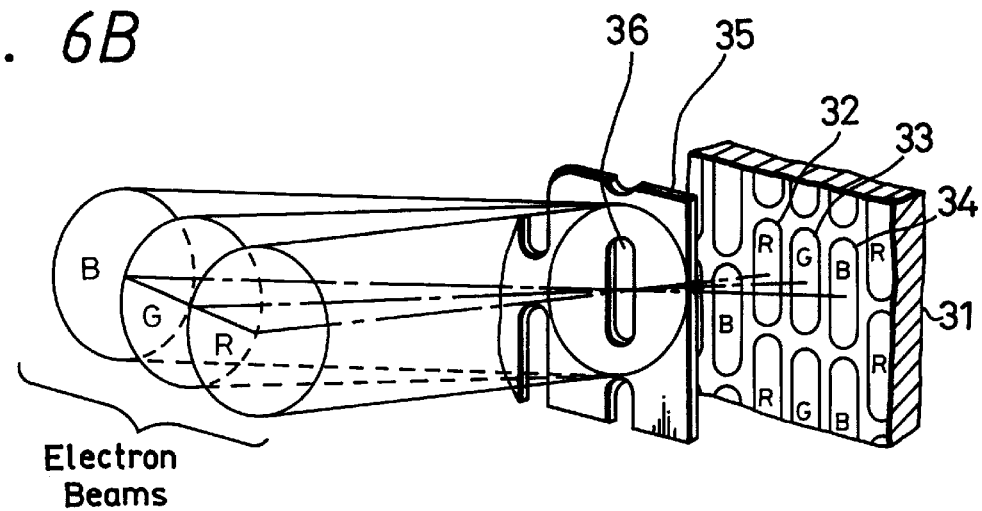
Figure 6C:
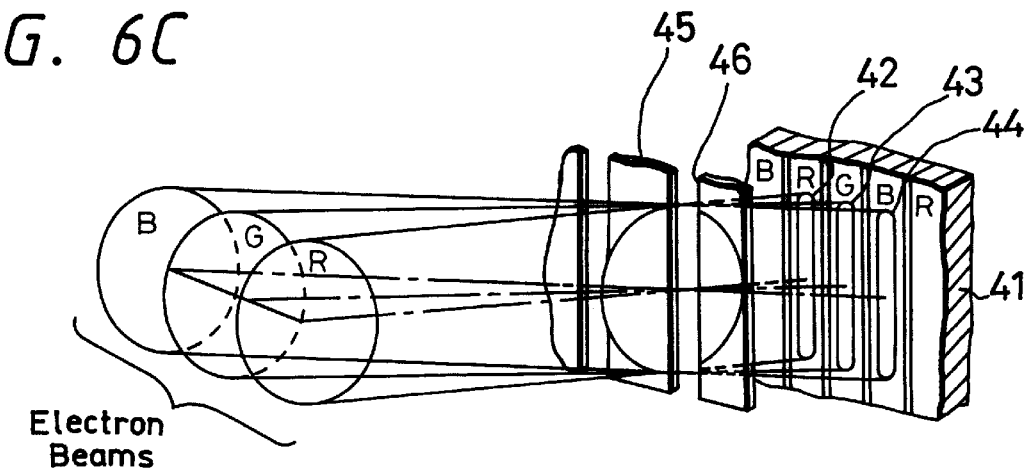

FIGS. 6A to 6C are schematic diagrams showing structures of a shadow mask or an aperture grill and fluorescent screens. FIG. 6A is a schematic diagram showing a shadow mask and a fluorescent screen used when three electron guns of the delta-type gun arrangement are employed. A fluorescent screen is formed on a panel glass 21. The fluorescent screen is formed of a large number of red fluorescent dots 22, green fluorescent dots 23 and blue fluorescent dots 24.

A shadow mask 25 is formed of a thin iron plate with a thickness of about 0.15 mm. The shadow mask 25 is disposed at a position by about 10 mm distant from the fluorescent screen on the panel glass 21 toward the electron guns. The shadow mask 25 has opening portions 26 with diameters of about 0.20 mm to 0.25 mm formed thereon regularly. The opening portion 26 corresponds to the red fluorescent dot 22, the green fluorescent dot 23 and the blue fluorescent dot 24 which form a pixel.

In this case, electron beams radiated from the delta-type electron guns cross one another at a point on the shadow mask 25 and scan the entire surface of the fluorescent screen on the panel glass 21. However, since the electron beams radiated from the three R, G, B electron guns are blocked by the shadow mask 25, only the electron beams which pass though the opening portions 26 can reach the fluorescent screen.

The electron beams radiated from the red, green and blue electron guns impinge on the red fluorescent dot 22, the green fluorescent dot 23 and the blue fluorescent dot 24, respectively.

FIG. 6B is a schematic diagram showing a shadow mask and a fluorescent screen used when the three electron guns of the inline-type gun arrangement are employed. In this case, a fluorescent screen is formed on a panel glass 31 such that a large number of red fluorescent slots 32, green fluorescent slots 33 and blue fluorescent slots 34 are arranged in a predetermined pattern.

A shadow mask 35 is formed of a thin iron plate with a thickness of about 0.15 mm. The shadow mask 35 is disposed about 10 mm ahead of the fluorescent screen on the panel glass 31 in the direction from the electron gun. The shadow mask 35 has slot opening portions 36 arranged thereon regularly. The slot opening portion 36 corresponds to the red fluorescent slot 32, the green fluorescent slot 33 and the blue fluorescent slot 35 which form one pixel.

Electron beams radiated from the inline-type electron guns cross one another at a point on the shadow mask 35 and scan the entire surface of the fluorescent screen on the panel glass 31. However, since the electron beams radiated from the three R, G, B electron guns are blocked by the shadow mask 35, only the electron beams which pass though the opening portions 36 can reach the fluorescent screen. The red, green, and blue electron guns impinge on the red, green, and blue fluorescent slots 32, 33, 34, respectively.

When the inline-type electron guns which are arranged in a line on a horizontal plane are employed, it is possible to easily achieve convergence of the three electron beams on the entire screen, i.e., a so-called dynamic convergence as compared with the delta-type electron guns which are disposed at the corners of the equilateral triangle.

FIG. 6C is a schematic diagram showing an aperture grill and a fluorescent screen provided in the Trinitroii type television receiver. In this case, a fluorescent screen is formed on a panel glass 41. A large number of red fluorescent stripes 42, green fluorescent stripes 43 and blue fluorescent stripes 44 are arranged on the panel glass 41 in a predetermined pattern.

An aperture grill 45 is a shadow mask having a large number of vertical stripe slits 46 formed by etching a thin, soft metal plate. The aperture grill 45 is provided in front of the panel glass 41 in the direction from the electron gun. The vertical stripe slit 46 of the aperture grill 45 corresponds to the red fluorescent stripe 42, the green fluorescent stripe 43 and the blue fluorescent stripe 45 which form one pixel.

In this case, electron beams radiated from the three-electron guns of the inline gun arrangement cross one another at a point on the aperture grill 45 and scan the entire surface of the fluorescent screen. However, since the electron beams radiated from the three R, G, B electron guns are blocked by the aperture grill 45, only the electron beams which pass though the vertical stripe slits 46 can reach the fluorescent screen. The R, G, B electron guns impinge on the red, green and blue fluorescent stripes 42, 43, 44, respectively.

Thus, it is possible to apply the present invention to all kinds of the CRTs having a three electron gun structure as described above. Therefore, it is possible to easily prevent the spot afterglow on the CRT.

Particularly, when the CRT has an aperture grill for use in the Trinitron type CRT, the ratio between the area of the openings on the aperture grill to the screen are is high as compared with that of the shadow mask type CRT, and the electron beams reach a large area of the fluorescent screen. Therefore, it is clear that a residual voltage on the anode side leads to the spot afterglow more frequently. Accordingly, the present invention can be applied to the aperture grill type CRT more effectively.

While the display device employing the electron beam is the CRT of a television receiver in this embodiment, the present invention is not limited thereto and can be applied to a CRT of general monitor devices which display a picture by using an electron beam. While the on-screen display memory 7 is used to display white on the entire screen in this embodiment, a drive circuit for the R, G, B video signals may be,directly operated to display white on the entire screen.

Having described a preferred embodiment of the present invention with reference to the accompanying drawings, it is to be understood that the present invention is not limited to that precise embodiment and that various changes and modifications can be effected therein by one skilled in the art without departing from the spirit or scope of the present invention as defined in the appended claims.

What is claimed is:

1. A device having a display device employing a cathode-ray tube, a power supply, deflection coils and electron beams, comprising:

an on-screen display memory for storing white display data used to output an entirely white picture and for storing control data;

means for supplying a signal to said cathode-ray tube to display the entirely white picture based on the white display data stored in said on-screen display memory;

a deflection system circuit unit; and a microcomputer for controlling said on-screen display memory to output said white display data to display said white picture for a period of time sufficient to discharge an anode voltage accumulated on a fluorescent surface of said cathode-ray tube based on said control data stored in said on-screen display memory in accordance with a de-energizing operation of said power supply of said display device and for controlling said deflection system circuit unit to supply ranges of deflection voltages to said deflection coils sufficient to scan said electron beams across the entire area of said fluorescent surface of said cathode-ray tube during said de-energizing operation.

2. A device according to claim 1, wherein said display device employing the electron beams is formed of a cathode-ray tube of a three-electron gun system.

3. A device according to claim 2, wherein said time to display said white picture on the entire screen of said cathode-ray tube is one second or less.

4. A device according to claim 3, wherein the ranges of deflection voltages to display said white picture on the entire screen of said cathode-ray tube have maximum levels at which display can be carried out in a normal display state.

5. A device according to claim 1, wherein said period of time to display said white picture on the screen of said cathode-ray tube is one second or less.

6. A device according to claim 1, wherein the ranges of deflection voltages to display said white picture on the entire screen of said cathode-ray tube have maximum levels at which display can be carried out in a normal display state.

7. A method for discharging an anode voltage from a display surface of a cathode ray tube when the tube is powered down, the method comprising the steps of:

retrieving control data and white display data from an on-screen display memory for controlling a time duration corresponding to the control data to display a white screen image corresponding to the white display data; and controlling electron guns of the cathode ray tube according to the control data to radiate electron beams on the anode and thereby display the white screen image on the display surface of the cathode ray tube for the time duration, wherein the time duration is selected to substantially discharge the anode voltage.

8. The method according to claim 7 wherein the time duration is a period of one second or less.

* * * * *